(12) United States Patent
Myers et al.

(10) Patent No.: US 10,207,348 B2
(45) Date of Patent: Feb. 19, 2019

(54) DUAL POSITION BLADE GUIDE FOR VERTICAL OR HORIZONTAL POSITION OF BAND SAW

(71) Applicant: JPW Industries Inc., La Vergne, TN (US)

(72) Inventors: Steven Myers, Buffalo Valley, TN (US); Charles Weber, Onalaska, WI (US)

(73) Assignee: JPW Industries Inc., LaVergne, TN (US)

( * ) Notice: Subject to any disclaimer, the term of this patent is extended or adjusted under 35 U.S.C. 154(b) by 111 days.

(21) Appl. No.: 15/176,736

(22) Filed: Jun. 8, 2016

(65) Prior Publication Data
US 2017/0355029 A1 Dec. 14, 2017

(51) Int. Cl.
*B23D 55/00* (2006.01)
*B23D 55/08* (2006.01)
*B23D 55/02* (2006.01)
*B23D 53/00* (2006.01)

(52) U.S. Cl.
CPC ......... *B23D 55/082* (2013.01); *B23D 53/006* (2013.01); *B23D 55/00* (2013.01); *B23D 55/023* (2013.01)

(58) Field of Classification Search
CPC .... B23D 55/082; B23D 55/023; B23D 55/00; B26D 5/00
USPC .................................................. 83/788–825
See application file for complete search history.

(56) References Cited

U.S. PATENT DOCUMENTS

| | | | |
|---|---|---|---|
| 1,054,738 A * | 3/1913 | Wright | B27B 13/10 83/826 |
| 2,670,767 A * | 3/1954 | Miller | B27B 13/10 83/545 |
| 2,928,439 A | 3/1960 | Tester | |
| 3,815,465 A * | 6/1974 | Smierciak | B23D 53/006 83/799 |
| 3,830,131 A | 8/1974 | Wells | |
| 3,848,493 A | 11/1974 | Harris | |
| 4,242,798 A | 1/1981 | Wikoff | |
| 4,364,294 A | 12/1982 | Eccardt | |
| 4,658,689 A | 4/1987 | Yakich | |
| 4,901,612 A | 2/1990 | Harris | |
| 5,107,738 A | 4/1992 | Aoyagi | |
| 5,410,934 A | 5/1995 | Krippelz | |

(Continued)

OTHER PUBLICATIONS

Northern Industrial Tools Horizontal and Vertical Metal Cutting Band Saw Owner's Manual, Model 155790, Aug. 27, 2008, 11 pages.

*Primary Examiner* — Ghassem Alie
*Assistant Examiner* — Nhat Chieu Do
(74) *Attorney, Agent, or Firm* — Waller Lansden Dortch & Davis, LLP; Blake M. Bernard

(57) ABSTRACT

A blade guide for a band saw tool includes an adjustment channel mounted to a blade housing. The adjustment channel has a bracket plate with two recesses at an angle to one another. A roller bracket has a ridge that fits into one or the other recess, the roller bracket including rollers to guide the band saw blade. A single screw holds the roller bracket to the bracket plate. The roller bracket may be moved to the other recess to impart a twist to the blade. The blade is used without a twist when the band saw tool is configured for vertical cutting and is used with a twist when the band saw tool is configured for horizontal cutting.

7 Claims, 9 Drawing Sheets

(56) References Cited

U.S. PATENT DOCUMENTS

| | | |
|---|---|---|
| 6,202,528 B1 | 3/2001 | Morgan |
| 7,874,236 B2 | 1/2011 | Diener |
| 8,047,114 B2 | 11/2011 | Pollard |
| 8,210,080 B2 | 7/2012 | Tokiwa et al. |
| 8,365,643 B2 | 2/2013 | Aihara et al. |
| 8,567,295 B2 | 10/2013 | Wackwitz et al. |
| 2009/0077816 A1* | 3/2009 | Gibbons .............. B23D 51/025 30/392 |

* cited by examiner

DUAL POSITION BLADE GUIDE FOR VERTICAL OR HORIZONTAL POSITION OF BAND SAW

CROSS REFERENCE TO RELATED APPLICATION

The present application incorporates by reference the disclosure of US Patent Application entitled "Work Table for Band Saw for Use in Vertical or Horizontal Saw Position and Method", U.S. application Ser. No. 15/176,474, naming Steven Myers and Charles Weber as inventors, which application is being filed on the same date as the present application.

BACKGROUND OF THE INVENTION

Field of the Invention

The present invention relates generally to a method and apparatus for guiding a blade of a band saw, and more particularly to a method and apparatus for guiding a band saw blade for vertical or horizontal saw positions.

Description of the Related Art

Band saws are commonly used for cutting materials such as wood or metal using a band saw blade. The band saw blade is in the shape of a continuous loop of flexible steel with saw teeth formed along one edge of the band-shaped blade. The band saw blade is mounted onto two wheels of the band saw, one of which is driven by a motor. As the motor drives the wheel on which the band saw is mounted, the material to be cut is brought into contact with a length of the moving blade extending between the two wheels.

Some band saw tools are configured for vertical cutting with one wheel above the wheel and the blade extending vertically between the wheels. The cutting portion of the blade is oriented vertically and is ordinarily held stationary as the material to be cut is moved toward the blade. Other band saw tools are configured with the wheels side-by-side and the blade extending horizontally between the wheels. The cutting portion of the blade is oriented horizontally and ordinarily the blade is movable against a stationary workpiece to be cut. A horizontal blade band saw may be referred to as a position of a cut-off saw or chop saw. Horizontal blade band saws may have the wheels tilted at an angle and the cutting portion of the blade twisted to permit vertical cutting of the material without interference between the work piece an a return portion of the blade.

Band saw tools are known that are convertible from a vertical blade configuration to a horizontal blade configuration by pivoting the wheels between the two positions.

SUMMARY OF THE INVENTION

The present invention provides a blade guide for use on a band saw that is convertible between a vertical blade position and a horizontal blade position. The blade guide is convertible between a position that guides the blade without twisting, such as during use in a vertical blade orientation, and a position that applies a twist to the blade, such as during use in a horizontal blade orientation.

DETAILED DESCRIPTION OF THE PREFERRED EMBODIMENTS

Figure 1:
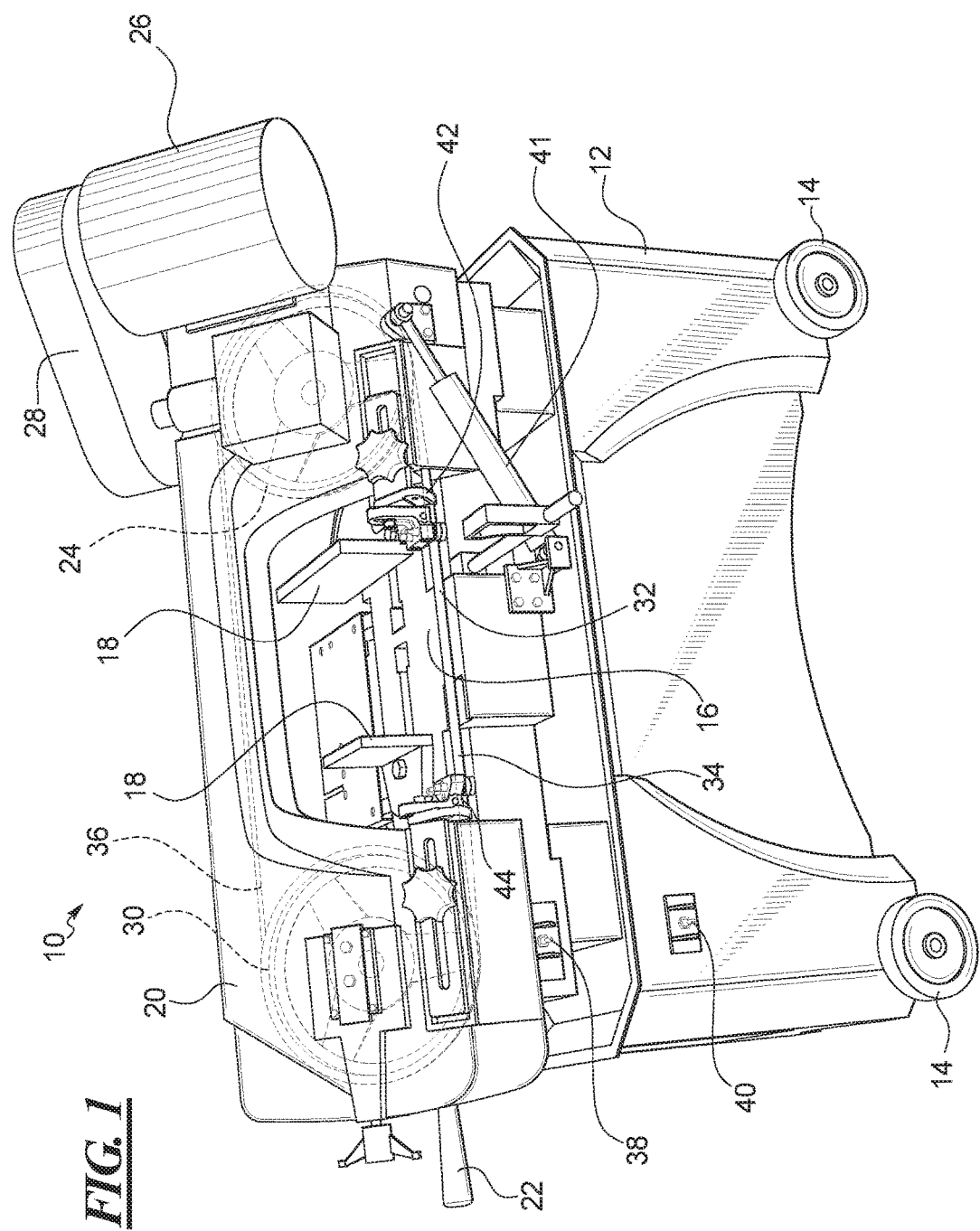
FIG. 1 is a top, front perspective view of a band saw tool in a horizontal blade position.

In FIG. 1, a band saw tool 10 has a base 12 mounted on wheels 14 for movement about a work area. The base 12 may also be provided without wheels for stationary use. On the base 12 is a work table 16 with work piece guides 18 for aligning a work piece. The work piece guides 18 may be adjustable longitudinally of the work table 16 to provide a work holding vise to hold a work piece during cutting. A blade housing 20, also referred to as a bow, is mounted for pivoting movement relative to the work table 16. The blade housing 20 has a handle 22 that may be grasped by a user to move the blade housing 20 in the pivoting motion. Within the blade housing 20 is mounted a first wheel 24 that is driven by a motor 26 through a transmission 28. A second wheel 30 is mounted in the blade housing 20 spaced from the first wheel 24. A band saw blade 32 is mounted on the wheels 24 and 30 for movement as the wheels 24 and 30 rotate. The band saw blade 32 extends between the wheels 24 and 30 at a forward portion 34 and a return portion 36. The forward portion 34 is exposed for use in cutting work pieces and the return portion 36 is enclosed within the blade housing 20.

To provide clearance for longer work pieces, the return portion 36 of the blade 32 and the portion of the blade housing 20 that encloses the return portion 36 are spaced above the work table 16 even when the forward portion 34 of the blade 32 is at the work table 16. This permits longer work pieces to be positioned under the blade housing 20 and return portion 36 when the work piece is being cut by the forward portion 34 of the band saw blade 32. The spacing is accomplished by tilting the rotating plane of the wheels 24 and 26 and the blade housing 20 at an angle relative to the work table 16.

The blade housing 20, the wheels 24 and 30, the band saw blade 32 and the motor 26 are pivotable about an axis that is parallel to the work table 16. To use the band saw tool 10 in the horizontal blade position, a work piece is placed on the work table 16. The blade housing 20, motor 26 and blade 32 are pivoted up to a position with the forward portion 34 of the band saw blade above the work piece, for example using the handle 22 to move the blade housing 20 to the pivoted-up position. The work piece is moved to a position with the desired cut location beneath the forward portion 34 of the blade 32. A power switch 38 is provided on the work table 16 to control power to the motor 26. A further power switch 40 is provided on the base 12 to control the motor or for other features. The further power switch 40 may be provided in addition or instead of the power switch 38. In certain embodiments, the switch 38 is a main power switch and the switch 40 is to control power to a coolant pump which may be provided.

The user operates the switch 38 or 40 to power up the motor 26 which drives the blade 32. The motor 26 may be powered up before or after pivoting the blade housing 20 to the up position. The user pivots the forward portion 34 of the blade 32 downward onto the work piece to cut the work piece using the moving forward portion 34 of the blade 32. Continuing the downward pivoting movement of the blade housing 20 cuts into and possibly through the work piece. The band saw tool 10 has a cylinder 41, such as a pneumatic cylinder, that dampens pivoting movement of the blade housing 20. The cylinder 41 may hold the blade housing 20 in the pivoted-up position and may assist the user in gradually moving the blade housing 20 down during cutting movement.

The rotating plane of the first and second wheels 24 and 30 is tilted relative to the pivoting and cutting direction of the forward portion 34 of the blade 32. To ensure that the forward portion 34 of the blade 32 is correctly positioned for cutting the work piece, the band saw blade 32 is twisted at the forward portion 34 by blade guides 42 and 44. The blade guide 44 guides the forward portion 34 of the blade 32 from an angled orientation as it passes along the perimeter of the second wheel 30 to a vertical orientation for cutting a work piece and then the blade guide 42 guides the forward portion 34 from the vertical orientation to the angled orientation as the blade 32 moves onto the perimeter of the first wheel 24.

Figure 2:
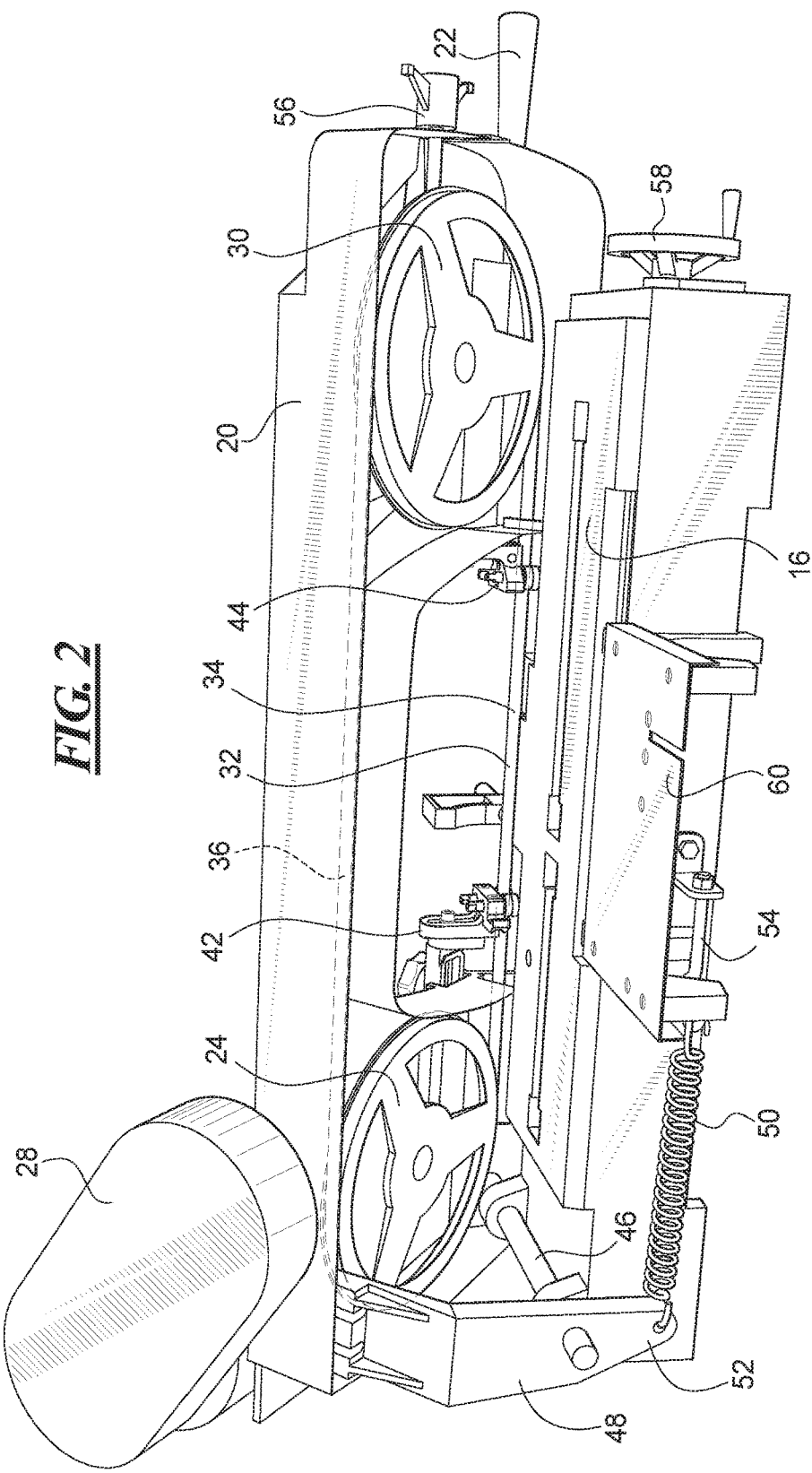
FIG. 2 is a top, rear perspective view of the band saw tool of FIG. 1 in the horizontal position.

In FIG. 2, the back view of the work table 16 and blade housing 20 of the band saw tool 10 is shown. The work table 16 has a pivot axle 46 at one end on which the blade housing 20 is mounted for pivoting movement. The blade housing 20 is supported on the pivot axle 46 by a bracket 48 at an angle to the work table 16. A spring 50 is connected between an extension 52 of the bracket 48 and a mount 54 on the work table 16. The spring 50 applies tension force to the blade housing 20 to assist the user in pivoting the blade housing 20 and/or to support the blade housing 20 in a pivoted position.

The first and second wheels 24 and 30 are visible at the underside of the blade housing 20 in the illustrated embodiment. In alternative embodiments, the wheels 24 and 30 may be enclosed within a blade housing that covers both the top side and underside of the wheels 24 and 30. The tension on the band saw blade 32 is adjustable by changing the spacing of the wheels 24 and 30 from one another. The wheel spacing may be changed by a wheel spacing adjustment device 56. By operating the wheel spacing adjustment device 56, the second wheel 30 may be moved closer to or farther from the first wheel 24. Adjustment of the blade tension may be useful in the ordinary use of the band saw tool 10, but it may have particular importance in adjusting the blade guides 42 and 44, as will be discussed hereinafter. Other controls and adjustments for the band saw tool 10 may be provided, including an adjustment wheel 58 mounted in the work table 16. The adjustment wheel 58 may be used to adjust the position of a work holding vise 18 on the work table 16. An extension 60 of the work table 16 may be attached to the work table 16 by the user, as needed.

Figure 3:
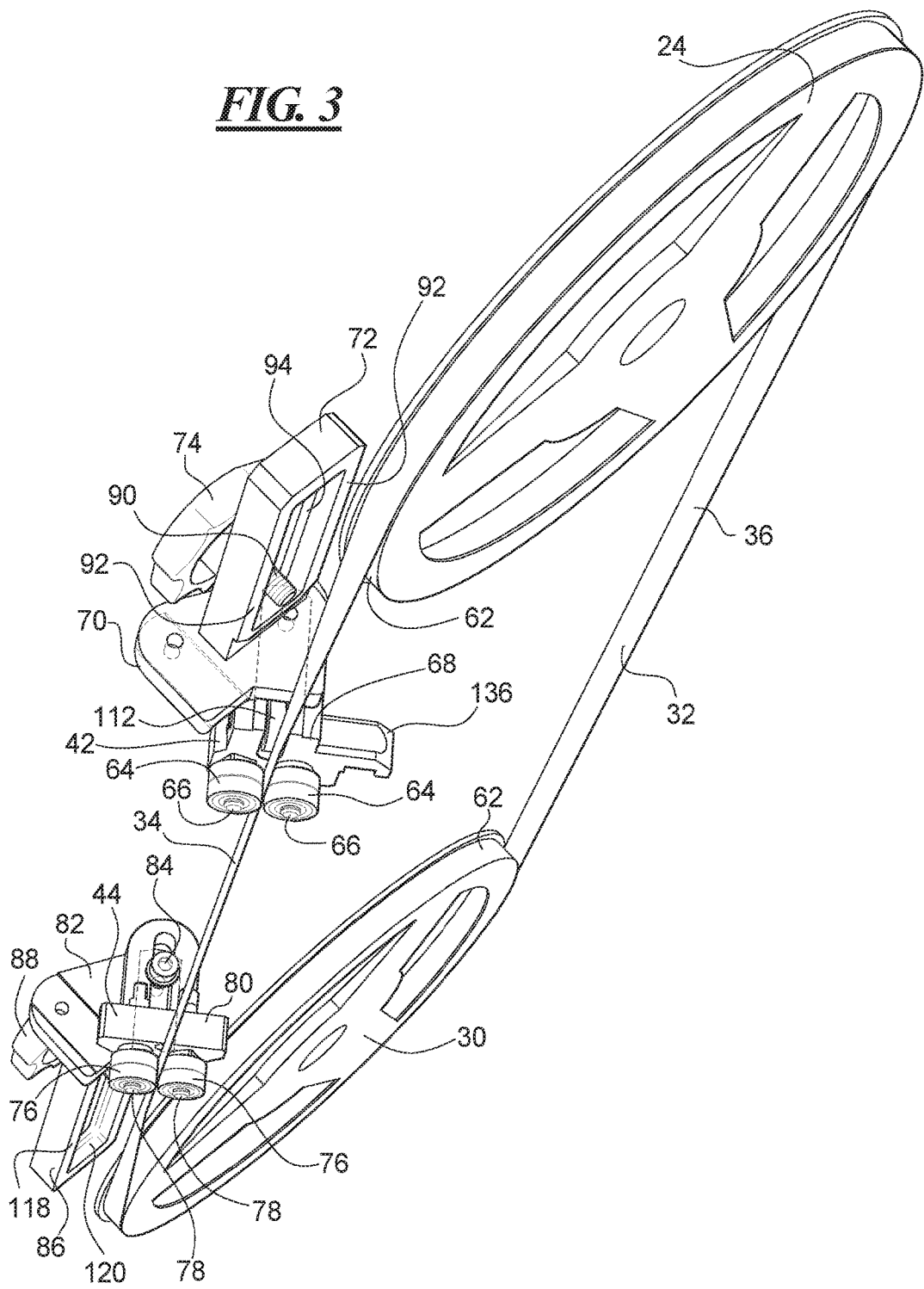
FIG. 3 is a perspective view of the disembodied band saw blade, wheels and blade guides showing their relative positions in the band saw when in the horizontal blade position.

Turning to FIG. 3, the first and second wheels 24 and 30 are each shaped with a blade supporting perimeter 62 on which the band saw blade 32 is mounted. The blade supporting perimeter may include a non-slip material, such as a rubber coating, on which the blade 32 rides during operation of the band saw tool 10. The blade supporting perimeter 62 is generally parallel with the rotational axis of the respective wheels 24 and 30. The blade guides 42 and 44 twist the forward portion 34 of the blade 32 to a position parallel with the direction of movement as the tilted wheels are moved toward a work piece.

The blade guide 42 includes a pair of rollers 64 between which the blade 32 is positioned. The rollers 64 are mounted on roller axles 66 that extend from a roller bracket 68. The roller bracket 68 is connected to a bracket plate 70 at a position that imparts the desired twist to the blade 32 when the blade passes between the rollers 64. The bracket plate 70 is connected to an adjuster channel 72 and an adjuster knob 74 is fastened through the adjuster channel 72. The adjuster channel 72 may be referred to as a mounting bracket.

The blade guide 44 has a similar construction. A pair of rollers 76 is mounted on roller axles 78 that extend from a roller bracket 80. The roller bracket 80 is fastened to a bracket plate 82. In this view, a fastener 84, such as a screw or bolt, is seen holding the roller bracket 80 to the bracket plate 82. The bracket plate 82 is connected to an adjuster channel 86. The adjuster channel 86 includes an adjuster knob 88 extending through the adjuster channel 86. The adjuster channel 86 may be referred to as a mounting bracket.

Figure 4:
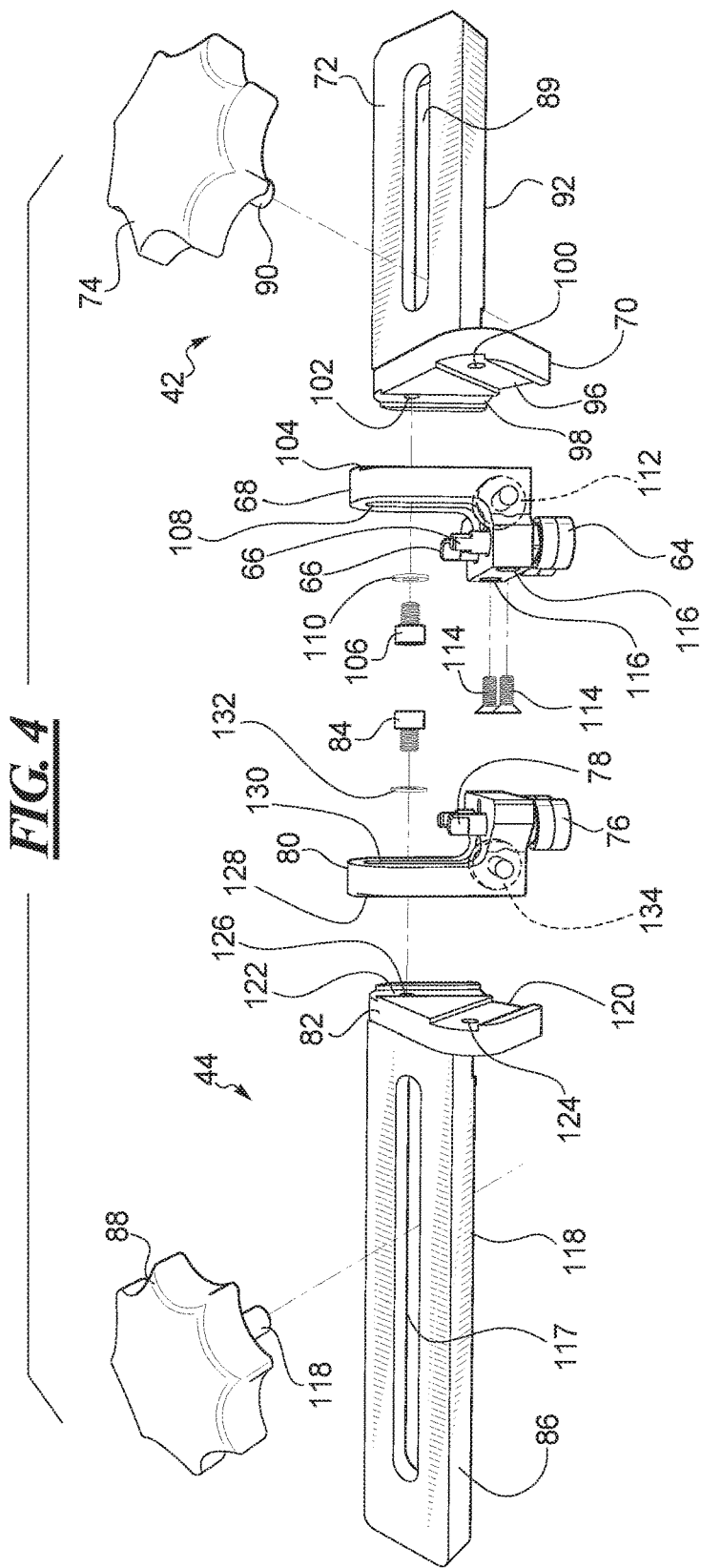
FIG. 4 is an exploded view of two blade guides for use in the band saw tool of FIG. 1.

With reference to FIG. 4, the adjuster channel 72 of the blade guide 42 is shorter in the illustrated embodiment. The adjuster channel 72 includes a slot 89 into which extends a threaded bolt portion 90 of the adjuster knob 74. The adjuster channel 72 may be adjusted to different positions on the blade housing 20 using the adjuster knob 74. The adjuster channel 72 may have rearwardly extending flanges 92 between which is formed a recess 94, which is shown in FIG. 3. A correspondingly shaped portion may be formed on the blade housing 20 where the adjuster channel 72 is mounted.

Returning to FIG. 4, at the end of the adjuster channel 72 is the bracket plate 10. The bracket plate 70 may be formed in one piece with the adjuster channel 72 or may be formed as a separate piece that is joined to the adjuster channel. The bracket plate 70 extends generally perpendicular to the adjuster channel 72 and includes two recesses 96 and 98 at an angle to one another. A threaded bore 100 and 102 is provided in each of the recesses 96 and 98. The angle between the recesses 96 and 98 may correspond to the tilt angle of the wheels 24 and 30 relative to the work table 16. To describe the angle another way, the angle between the recesses 96 and 98 may correspond to the degree of twist applied to the blade 32 when the band saw tool 10 is used in the horizontal cutting configuration compared to the non-twisted position of the blade 32 when used in the vertical orientation. In certain embodiments, the angle between the recesses 96 and 98 is about 44 degrees, plus or minus one degree. Other angles may be used as well. The angle between the recesses 96 and 98 defines the angular change in the blade guide that may be provided.

The roller bracket 68 includes a ridge 104 that is shaped to fit into either the recess 96 or the recess 98. The user may change the roller bracket 68 from a position with the ridge 104 being mounted in the recess 96 to a position to mount the ridge 104 of the roller bracket 68 in the recess 98, or vice versa, so as to change blade from a twisted state to a non-twisted state, or vice versa. The ridge 104 is held in either the recess 96 or the recess 98 by a screw 106 that passes through a slot 108 in the roller bracket 68 and into a corresponding one of the threaded bores 100 and 102 in the bracket plate 70. In certain embodiments, the recesses 96, 98, 120 and 122 are approximately 2 mm deep. The ridges 104 and 128 that fit into the recesses have a height of approximately 2 mm may be shaped to seat in the recesses without moving during use of the saw 10. The screw 106 is provided with a washer 110 in the illustrated embodiment.

The roller bracket 68 of certain embodiments has an L shape with the slot 108 in a first leg of the "L" and the rollers 64 in the second leg of the "L." The slot 108 may extend to the junction between the legs of the "L". A back roller 112 may be mounted in the slot 108 on an axle that extends transverse to the axles 66 of the rollers 64. The back roller 112 is positioned to contact or nearly contact the back edge of the blade 32 as seen in FIG. 3. The back roller 112 supports the blade 32 for example when forward cutting pressure is applied to the blade during cutting.

As shown in FIG. 4, the axles 66 on which the rollers 64 are mounted extend through openings in the second leg of the L-shaped roller bracket 68. The axles 66 may be secured in the roller bracket 68 by being threaded into the roller bracket 68, for example using a flat on the end of the axle. In certain embodiments, a threaded nut (not shown) is fastened onto each of the axles 66 and 78. In certain embodiments, the axles 66 and 78 are threaded beginning at the flats. The rollers 64 are positioned on opposite sides of the blade 32 with the back roller 112 at the back edge of the blade 32, as shown in FIGS. 3 and 4. The rollers 64, 112, 76 and 134 may be provided with ball bearings or other friction reducing means. The roller bracket 68 may be provided with screws 114 that are threaded into openings 116 in the roller bracket 68. The screws 114 may be used to hold accessories or other items to the roller bracket 68.

The second adjuster channel 82 is provided with a slot 117 into which a threaded bolt portion 118 of the adjuster knob 88 extends for mounting the adjuster channel 82 on the blade housing 20. The adjuster channel 82 and slot 117 are longer than the adjuster channel 72 and slot 89, providing a greater extent of adjustment. The adjuster channel 82 may be provided with rearwardly extending flanges 118 and a recess 120 as described above and as shown in FIG. 3.

Returning to FIG. 4, the bracket plate 82 is formed with or mounted on the adjustment channel 86. The bracket plate 82 has two recesses 120 and 122 that are disposed at an angle to one another. The angle may be the same as the angle between the recesses 96 and 98 or may be at a different angle. In certain embodiments, the angle between the recesses 120 and 122 is 44 degrees, plus or minus one degree. Each recess 120 and 122 is provided with a threaded bore 124 and 126. The roller bracket 80 has a ridge 128 that is shaped to fit into one or the other of the recesses 120 and 122. The roller bracket 80 has a slot 130 through which the screw 84 extends into a corresponding one of the threaded bores 124 and 126 to hold the roller bracket 80 in place. A washer 132 is provided on the screw 84 in certain embodiments.

The roller bracket 80 is provided with the rollers 76 mounted on the axles 78. In certain embodiments, the axles 78 may be held in place by being threaded or otherwise fastened in the roller bracket 80. A back roller 134 is mounted in the roller bracket 80 in a position to engage the back edge of the blade 32 when the blade 32 is between the two rollers 76.

In certain embodiments, the roller bracket 68 is positioned along the recess 98 and fastened by the screw 106 (see FIG. 4) so as to locate the rear roller 112 close to and almost in contact with the back edge of the blade 32. The rear roller 112 is therefore in a position to support the blade 32 during cutting operations. The roller bracket 80 may be positioned along the recess 122 in a similar position. When the roller brackets 68 and 80 are moved to the other recesses 96 and 120, they may also be positioned with the rear rollers 112 and 134 close to the rear of the blade 32. The rear rollers 112 and 134 may be mounted on axles that are eccentrically mounted to permit fine adjustment of the roller positions.

Figure 5:
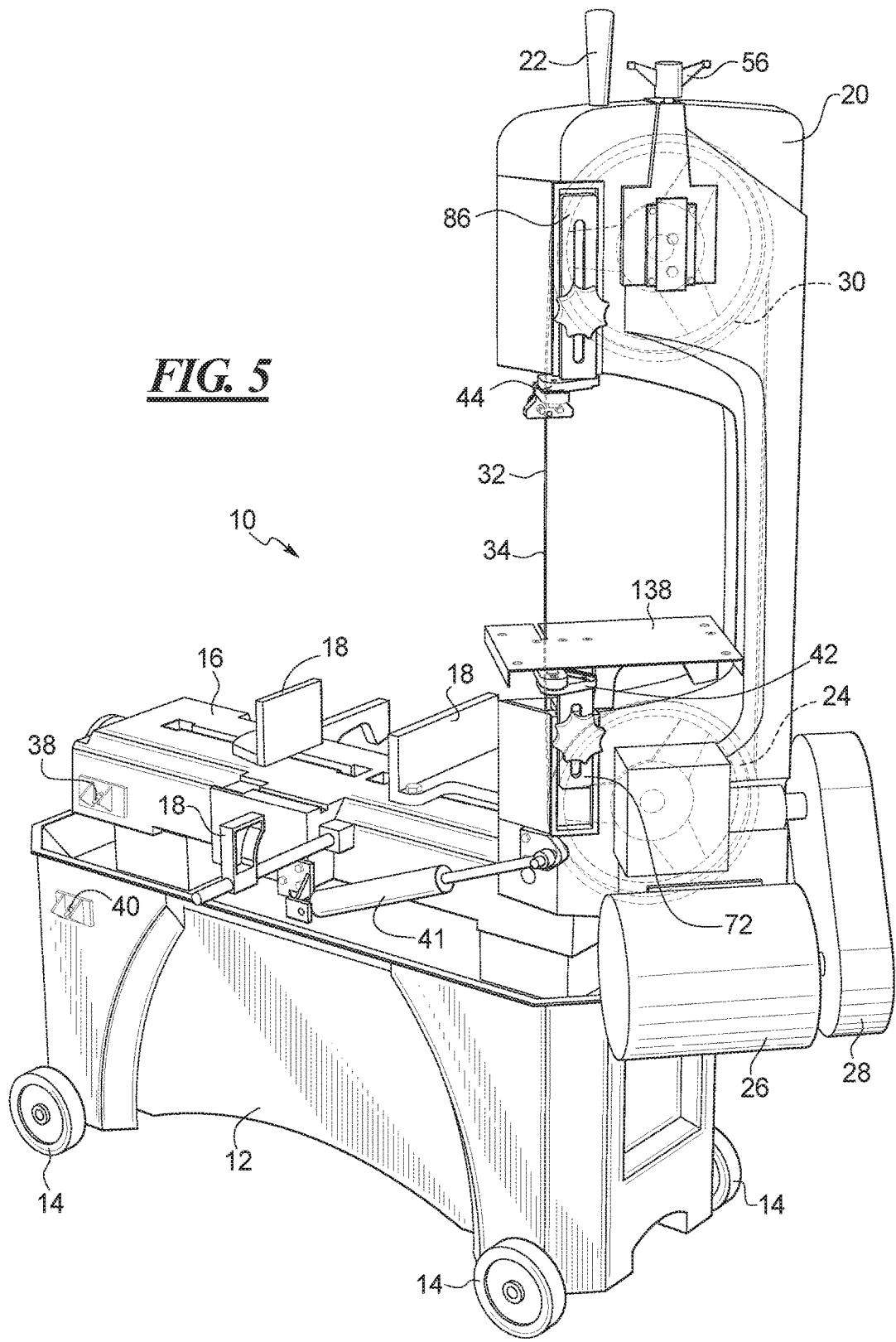
FIG. 5 is a front, right hand side perspective view of the band saw tool of FIG. 1 converted for vertical blade operation.

The adjuster channels 72 and 86 are of different lengths, as is apparent in FIGS. 1, 4 and 5. The shorter adjuster channel 72 may be adjusted when changing the miter angle of the saw. The longer adjuster channel 86 provides a greater amount of travel and may provide most of the adjustment to accommodate the width of a work piece.

Turning again to FIG. 3, the roller bracket 68 includes a lateral extension 136 which is not provided on the roller bracket 80. The lateral extension 136 may be used for mounting accessories or other items as will be described in further detail in the discussion of the vertical orientation of the band saw tool 10.

In FIG. 5, the band saw tool 10 is shown configured in the vertical orientation. The base 12 with the wheels 14 and the work table 16 remains in a horizontal position. The blade housing 20 is pivoted to a vertical orientation and may be locked into place. A step may be provided between the blade housing 20 and the base 12 that is positioned to avoid over travel during movement of the blade housing 20 to the vertical position. The cylinder 41 dampens movement between the two positions of the blade housing 20 at which the saw is used. The cylinder 41 acts as a damper against the force of gravity as the blade housing 20 is moved. In certain embodiments, the cylinder 41 is adjustable to change the amount of damping provided. For example, the cylinder 41 may be changed between no damping and locking out movement of the blade housing 20. The motor 26 and transmission 28 move with the blade housing 20. The forward portion 34 of the band saw blade 32 is no longer twisted from the orientation that extends over the wheels 24 and 30. The blade guides 42 and 44 support the blade 32 at the forward portion and are mounted on the blade housing 20 by the adjuster channels 72 and 86.

The adjustment of the blade guides 42 and 44 from the blade twisted position to the non-twisted position may add slack to the blade 32. The slack is removed and blade tension is set by a wheel spacing adjustment device 56. When the user desires to return the band saw tool 10 to the horizontal orientation with the blade guides 42 and 44 applying the twist to the blade 32, the wheel spacing adjustment device 56 may be adjusted to reduce tension on the blade 32 and to increase blade tension as needed.

A work table 138 is mounted to the blade housing 20 in a position so that the blade 32 passes through the work table 138. A work piece may be positioned on the work table 138 and the work piece moved toward the moving blade 32 for cutting. Work piece guides 18 may remain in place on the work table 16 when the band saw tool 10 is converted to vertical use.

Figure 6:
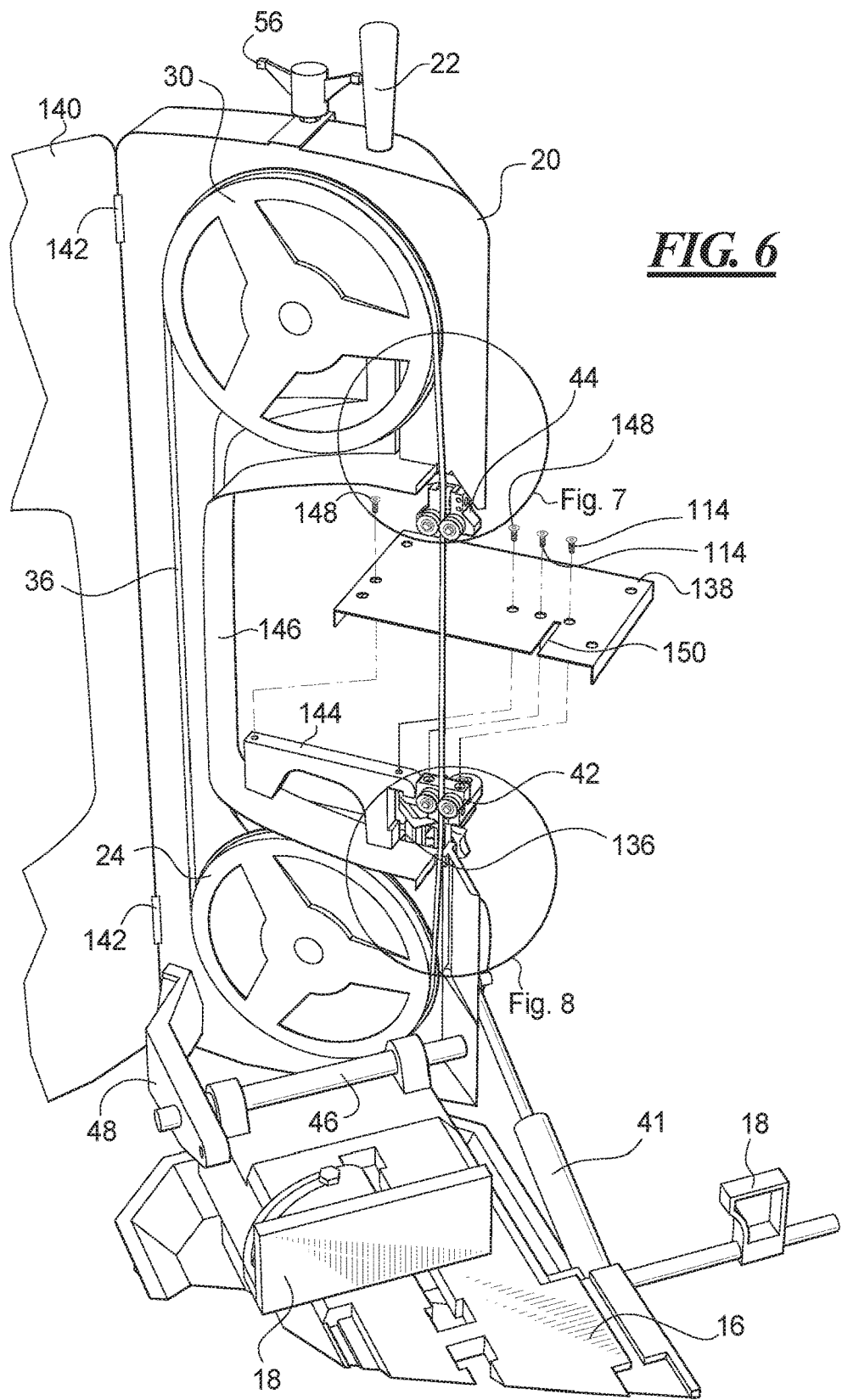
FIG. 6 is an exploded view of a portion of the band saw in the vertical blade configuration and showing two circled areas.

Turning to FIG. 6, the vertical orientation of the band saw tool 10 is shown with a rear cover 140, shown in fragmentary view, of the blade housing 20 in an open position. The rear cover 140 may be mounted to the blade housing 20 by hinges 142, or by other means. When the band saw tool 10 is being operated, the cover 140 is preferably fastened in a closed position to enclose the first and second wheels 24 and 30 and the return portion 36 of the band saw blade 32. Other configurations of blade housings may be provided within the scope of this invention.

When the blade housing 20 is moved from the horizontal orientation to the vertical orientation and is being prepared for operation in the vertical orientation, the blade guides 42 and 44 are adjusted by the user from configuration position that applies a twist to the blade 32, as shown for example in FIG. 3, to a position wherein the blade 32 is not twisted. The release of the twist on the blade 32 may change the tension on the blade. The user may adjust the blade tension using the wheel spacing adjustment device 56 to apply the desired tension to the blade 32. Similarly, a tension adjustment may be made when a twist is applied to a non-twisted band saw blade. Tension adjustments may be made at other times as well.

Converting the band saw tool 10 from the horizontal orientation to the vertical orientation may also involve reconfiguring the work piece support surfaces. In certain embodiments, the removable work table 138 is mounted on the blade housing 20 or other mounting location. In the illustrated example, the removable work table 138 is mounted at the lower blade guide 42. A support bracket 144 is mounted onto an inside surface 146 of the blade housing 20 and is connected to the lower blade guide 42, for example. at the lateral extension 136. The work table 138 is connected to the bracket 144 by screws 148. The work table 138 is connected to the blade guide 42 by the screws 114. When the work table 138 is in position, the band saw blade 32 passes through a slot 150 in the work table 138.

Figure 7:
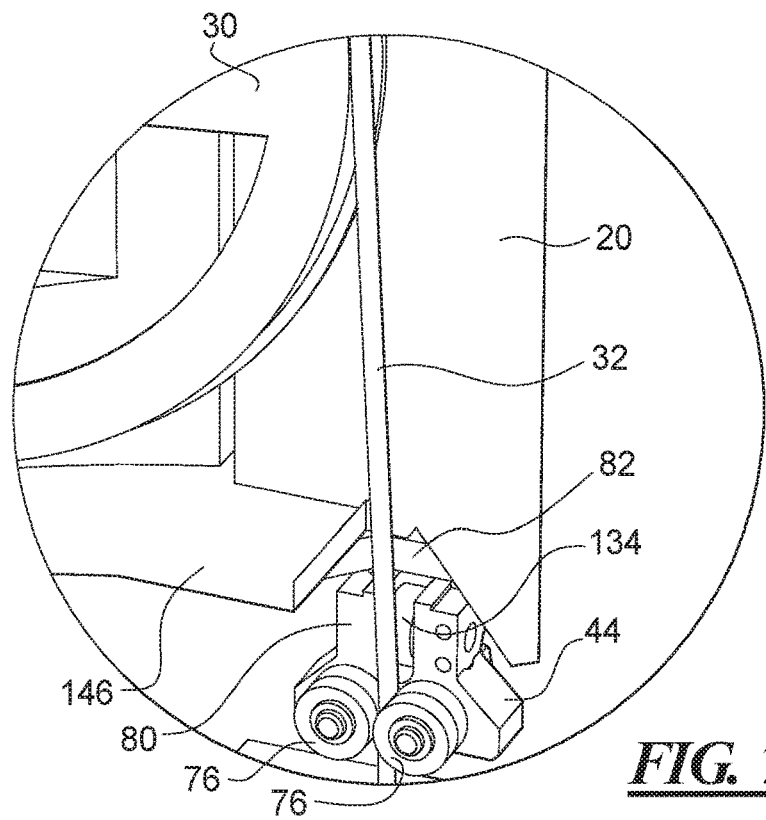
FIGS. 7 and 8 are enlarged views of the circled areas of FIG. 6 showing the blade guides positioned for vertical blade operation.

With reference to FIG. 7, the blade guide 44 includes the rollers 76 on opposite sides of the blade 32 and a back roller 134 at a back edge of blade 32, all mounted in the roller bracket 80. The roller bracket 80 has been positioned with the ridge 128 in the bracket plate 82 in the recess 120 or 122 that maintains the band saw blade 32 in the non-twisted position. The band saw blade is not twisted as it leaves the perimeter of the wheel 30.

Figure 8:
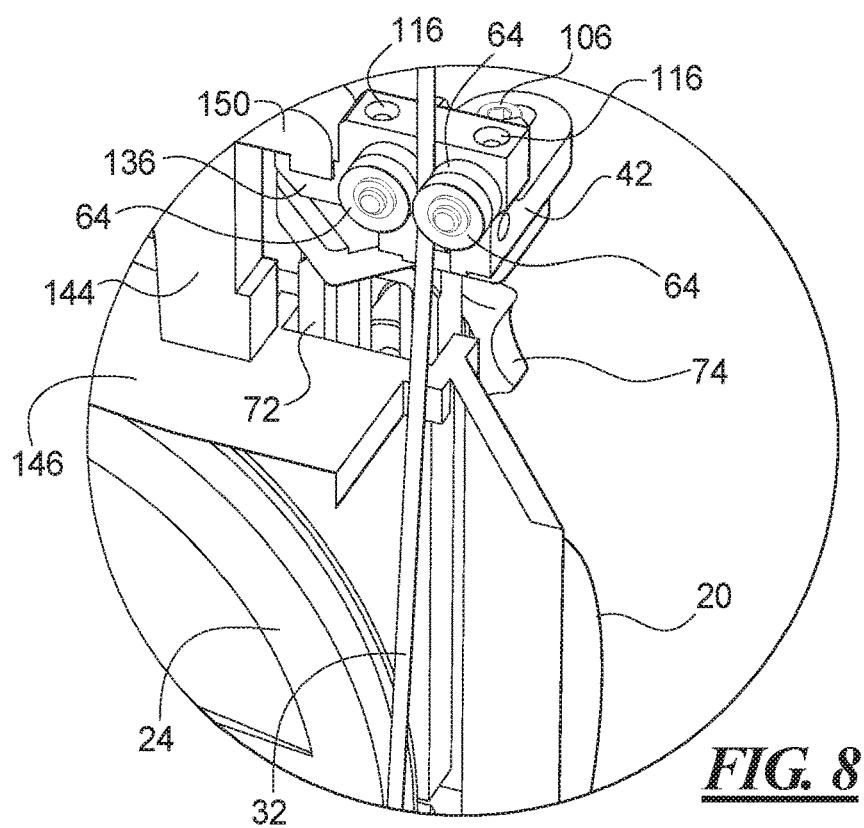

In FIG. 8, the lower blade guide 42 is adjusted to maintain the non-twisted condition of the blade 32 as the blade moves from the forward portion onto the lower wheel 24. The rollers 64 are positioned on opposite sides of the blade 32. A back roller (not visible in this view) is positioned at the back edge of the blade 32 to support the blade 32 against pressure from cutting. The adjuster knob 74 is loosened to permit the adjuster bracket 72 to be positioned on the blade housing 20 so that the support bracket 144 may be connected to the roller bracket 68. In particular, the support bracket 144 has an extension hook 150 that engages the lateral extension 136 of the roller bracket 68. The removable work table 138 is attached to the support bracket 144 and to the roller bracket 68, for example, by screws that extend into the threaded openings 116 in the roller bracket 68 and into threaded openings in the support bracket 144. The adjuster bracket 72 may be adjusted so that the support bracket 144 rests on the inside surface 146 of the blade housing 20.

Figure 9:
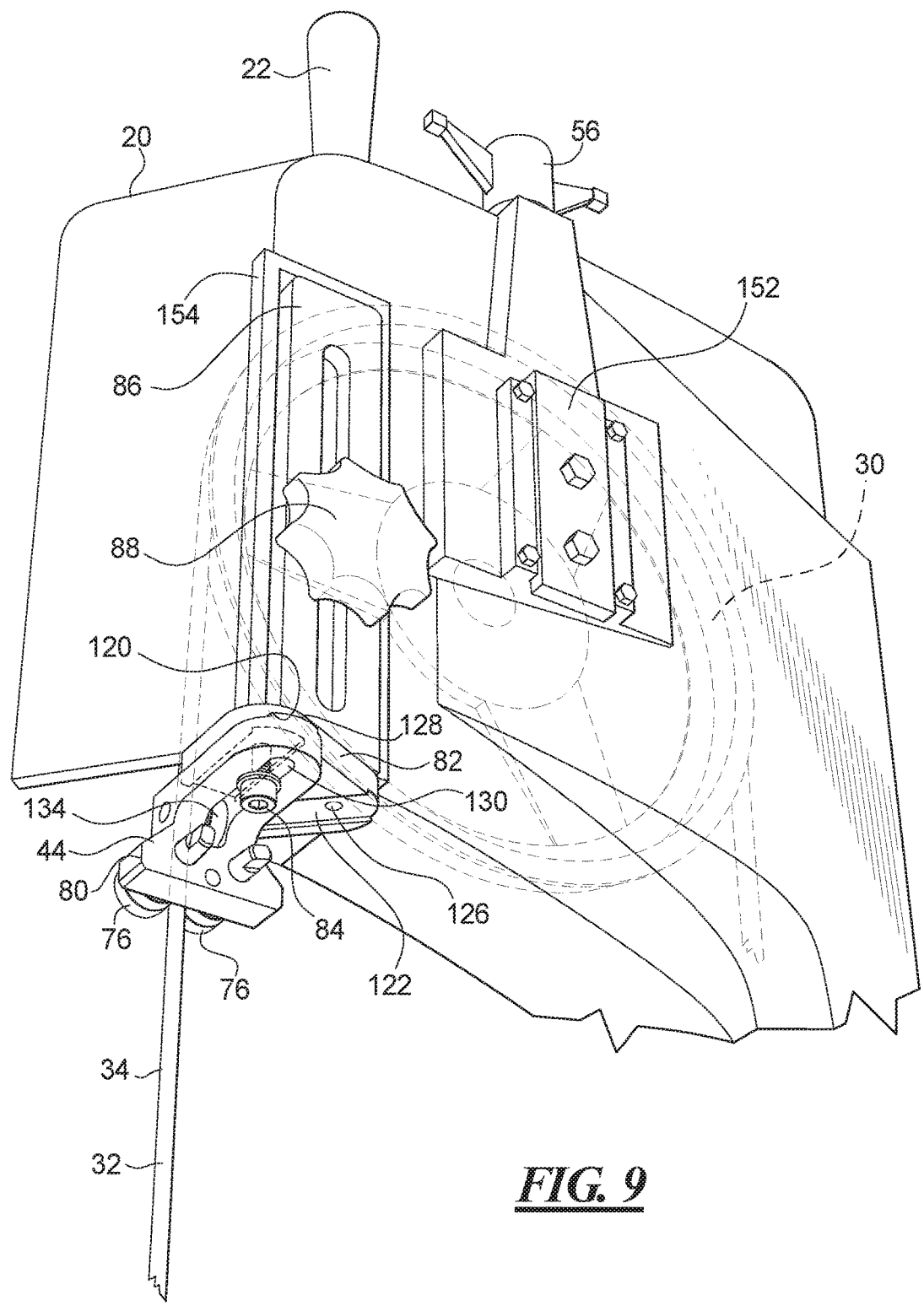
FIG. 9 is a fragmentary view of the upper wheel of the band saw tool showing the upper blade guide.

Turning to FIG. 9, a portion of the blade housing 20 enclosing the second wheel 30 is shown with the band saw tool 10 configured for vertical cutting. The handle 22 may have been used to move the blade housing 20 to the vertical position. The wheel spacing adjustment device 56 may be used to adjust the tension on the blade 32. The illustrated wheel spacing adjustment device includes an adjustment plate assembly 152 on the blade housing 20 that permits movement of the position of the wheel 30 within the blade housing 20. The adjustment of the wheel positions by the wheel spacing adjustment device 56 accommodates for the twist or lack of twist in the blade 32. In certain embodiments, the wheel spacing is adjusted to provide the same tension on the bade 32 regardless of whether blade is twisted or not.

The adjuster channel 86 is mounted in a receiver 154 on the blade housing 20 that permits the blade guide 44 to be repositioned closer to or further from the blade housing 20. The spacing of the blade guides 42 and 44 from one another may be adjusted, for example, to compensate for cutting larger or smaller work pieces, for more or less precision in cutting, or for the requirements of different blades.

The blade guide 44 is configured for non-twisted blade use by attaching the roller bracket 80 with the ridge 128 mounted in the recess 120. The roller bracket 80 is fastened in this position using the single screw 84. The ridge 128 of the roller bracket 80 may be moved along the recess 120 and fastened in place at different positions by tightening the screw 84 in the slot 130. The slot 130 permits fine adjustment of the roller bracket 80 in a direction perpendicular to the blade length. If the user wishes to change to the twisted blade operation, for example, to convert the band saw tool 10 for horizontal cutting, the user need only remove the single screw 84 from the roller bracket 80, move the roller bracket 80 so that the ridge 128 is in the other recess 122, and reinstall the screw 84 into the threaded opening 126. A similar change would be made in the other blade guide 42, as will be discussed.

The blade guide 44 is converted between the two use positions without guesswork as to the angle by the user and with by only removing and replacing a single screw per blade guide. The rollers 76 and the back roller 134 remain properly positioned for the new blade orientation. The blade guide 44 may be set to any position along the length of the blade 32, more specifically along the length of the forward portion 34 of the blade 32, while being configured in either the non-twisted position or the twisted position. The blade guide 44 is configured for either non-twisted operation or twisted operation independently of the blade tension adjustment. The blade guide 44 may be converted between its two positions by access to components that are external to the blade housing 20 or other tool housings. The tool housing 20 need not be opened or components disassembled to accomplish the change in the blade twist condition.

Figure 10:
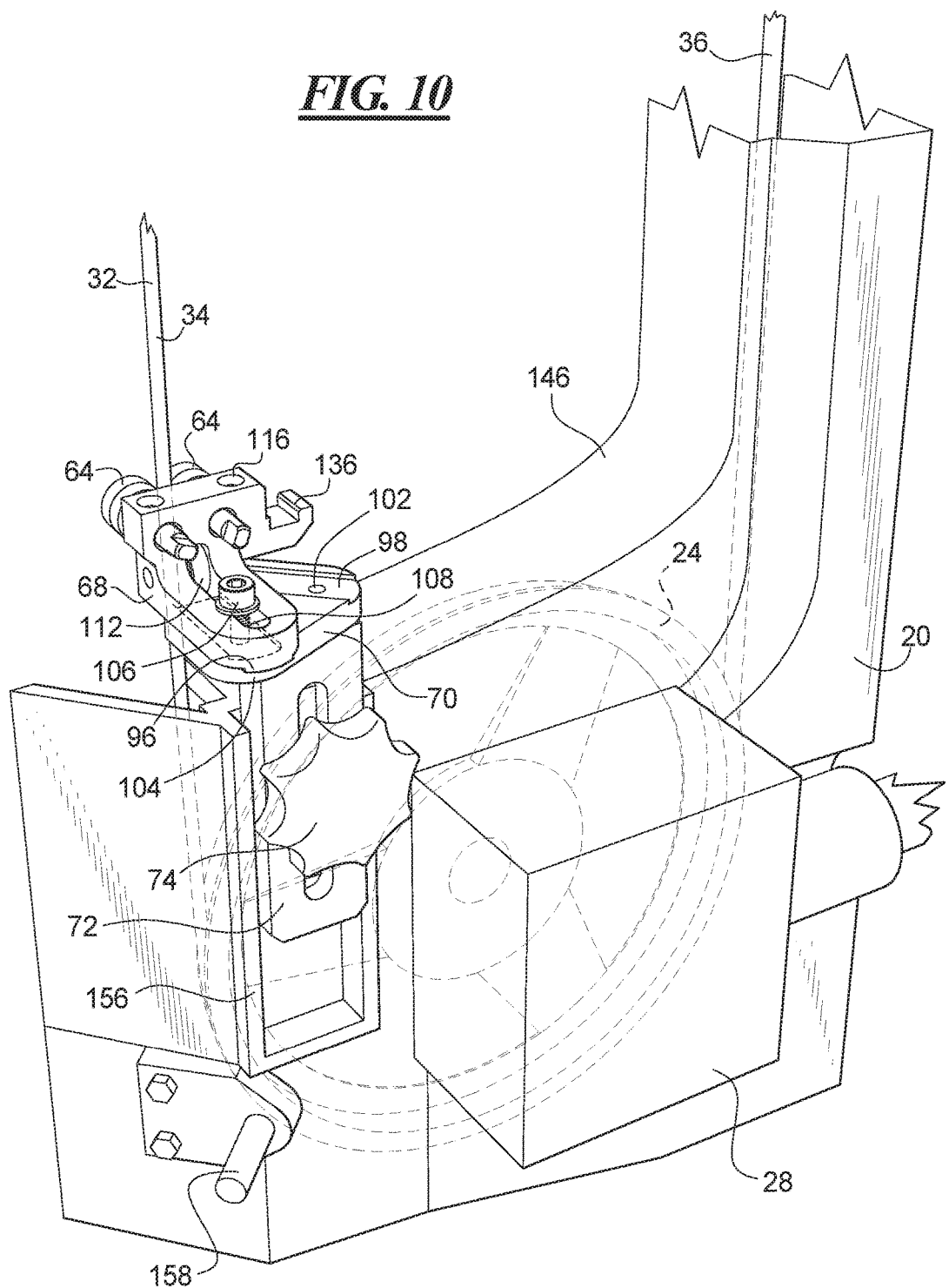
FIG. 10 is a fragmentary view of the lower wheel of the band saw tool showing the lower blade guide.

Similar advantages are provided by the blade guide 42 as shown in FIG. 10. The adjuster channel 72 is mounted in a receiver 156 on the outside of the blade housing 20. The adjuster channel 72 may be moved within the receiver 156 by loosening and tightening the adjuster knob 74 and moving the blade guide 42 along the direction of the blade 32. The adjustment of the position of the adjuster channel 72 may also be made to set the position of the roller bracket 68 as needed for mounting the support bracket 144 to the lateral extension 136.

The roller bracket 68 is mounted with the ridge 104 in the recess 96 and the screw 106 fastening the roller bracket 68 in place. The slot 108 permits the roller bracket 68 to be positioned with the ridge 104 moved along the recess 96 to any desired position. The roller bracket 68 may be positioned with the rollers 68 and the back roller 112 in position on the blade 32.

The roller bracket 68 may be disconnected from the bracket plate 70 by removing the screw 106. The roller bracket 68 may then be positioned with the ridge 104 fit into the recess 98 on the bracket plate 70 and fastened there by inserting the screw 106 into the threaded opening 102. The roller bracket 68 may be moved along the recess 98 to position the rollers 64 and 112 on the blade 32 as desired. In this way, the roller bracket 68 applies a twist to the forward portion 34 of the blade 32 so that the band saw tool 10 is converted from vertical cutting to horizontal cutting. The conversion is accomplished easily and quickly without guesswork by removing and replacing the single screw for each blade guide. The conversion from the horizontal cutting operation to the vertical cutting operation may be accomplished just as easily.

A connection post 158 is mounted on the blade housing 20 to which the cylinder 41 (not shown in this view) is connected to dampen movement of the blade housing 20 as it is moved between the vertical and horizontal positions. The transmission 28 for supplying rotary motion to the wheel 24 enters the blade housing 20 adjacent the wheel 24. The transmission 28 according to certain embodiments may include a step pulley mounted on the motor output shaft, on which is a belt that extends to another step pulley that turns a shaft. The shaft may be attached to a gearbox and a pinion shaft attached to the blade wheel 24.

Additional recesses may be provided in the bracket plates for connecting the blade guides at other angles or positioned.

The bracket plates may be provided with ridges at an angle to one another and the blade guides may each be provided with a recess that fits onto the ridges to provide positioning of the blade guides on the bracket plates at the different angles.

The bracket plates may each be provided with a single recess or ridge and the blade guides may be provided with a plurality of cooperating ridges or recesses so that the ridge or recess of the bracket plate is fit into or onto one of the multiple ridges or recesses of the blade guides.

Other structures, devices, and connectors means may be provided for connecting the blade guides at different angular positions on the blade housing or other structure within the scope of this invention.

The blade guide for a band saw tool includes an adjustment channel mounted to a blade housing. The adjustment channel has a bracket plate with two recesses at an angle to one another. A roller bracket has a ridge that fits into one or the other recess, the roller bracket including rollers to guide the band saw blade. A single screw holds the roller bracket to the bracket plate. The roller bracket may be moved to the other recess to impart a twist to the blade. The blade is used without a twist when the band saw tool is configured for vertical cutting and is used with a twist when the band saw tool is configured for horizontal cutting.

In a first aspect, a blade guide for use on a band saw tool, comprises: a mounting bracket configured for mounting to the band saw tool; a bracket plate connected to the mounting bracket; a roller bracket configured for mounting to the bracket plate, the roller bracket and the bracket plate being connectable to one another in first and second mounting positions at an angle to one another; and rollers mounted on the roller bracket, the rollers being configured for engaging a band saw blade of the band saw tool, the rollers being configured for guiding the band saw blade in a first position when the roller bracket and the bracket plate are connected in the first mounting position and for guiding the band saw blade in a second position when the roller bracket and the bracket plate are connected in the second mounting position, the first and second positions being disposed at an angle to one another so that at least one of the first and second positions impart a twist in the band saw blade.

In a second aspect, the blade guide of the first aspect further comprises a single fastener securing the roller bracket to the bracket plate.

In a third aspect, the blade guide of the first aspect further comprises a ridge on one of the bracket plate and the roller bracket for mounting in a recess in the other of the bracket plate and the roller bracket.

In a fourth aspect, the blade guide of the first aspect, wherein the roller bracket is adjustably positionable on the bracket plate along a direction transverse to the band saw blade.

In a fifth aspect, the blade guide of the first aspect, wherein the rollers are fixed in position on the roller bracket regardless of whether the roller bracket and the bracket plate are connected in the first or second mounting positions.

In a sixth aspect, the blade guide of the first aspect, wherein the rollers on the roller bracket include first and second rollers mounted for positioning on opposite sides of a band saw blade and a back roller mounted at a back edge of the band saw blade, the first and second rollers and the back roller being mounted in fixed positions on the roller bracket.

In a seventh aspect, the blade guide of the first aspect, wherein the mounting bracket includes an adjuster channel configured for connecting to the band saw tool, the adjuster channel being adjustable in position in a direction parallel to a length of the saw blade.

In an eighth aspect, the blade guide of the seventh aspect further comprises: an adjuster knob connecting the adjuster channel to the band saw tool, the adjuster knob being operable to adjust a position of the blade guide in a direction along a length of the band saw blade.

In a ninth aspect, the blade guide of the first aspect, wherein the bracket plate defines first and second recesses at an angle to one another, and wherein the roller bracket includes a ridge configured to fit into the first recess in the first mounting position and configured to fit into the second recess in the second mounting position.

In a tenth aspect, a method for changing a twist in a band saw blade, comprises: releasing a fastener that attaches a roller bracket to a bracket plate, the roller bracket having rollers configured to engage the band saw blade at a first blade position; removing a ridge on one of the roller bracket and the bracket plate from a recess in the other of the roller bracket and the bracket plate; inserting a ridge on one of the roller bracket and the bracket plate into a recess in the other of the roller bracket and the bracket plate, at least one of the ridge and the recess being at an angle to the ridge and recess in the removing step; fastening the roller bracket to the bracket plate at a position of the inserting step; and engaging the band saw blade with rollers at a second blade position, wherein at least one of the first and second blade positions are twisted blade positions.

In an eleventh aspect, the method of the tenth aspect, wherein the releasing includes releasing a single fastener and the fastening includes fastening a single fastener.

In a twelfth aspect, the method of the tenth aspect, wherein the inserting includes inserting a ridge on the roller bracket into a recess in the bracket plate, wherein the recess is one of two recesses in the bracket plate.

In a thirteenth aspect, a band saw tool, comprises: a work table having a surface for receiving a work piece to be cut; a blade housing pivotably connected to the work table for movement between a horizontal position and a vertical position; first and second wheels mounted in the blade housing; a motor connected to drive the first wheel; a band saw blade extending about the first and second wheels and movable in a sawing movement by operation to the motor; first and second blade guides mounted to the blade housing, each of the first and second blade guides including: a bracket plate connected to the blade housing; a roller bracket connected to the bracket plate; a first connector structure connecting the roller bracket to the bracket plate at a first position; a second connector structure connecting the roller bracket to the bracket plate at a second position, the second position being disposed at an angle to the first position; wherein at least one of the first and second positions of the first and second blade guides imparts a twist to the band saw blade.

In a fourteenth aspect, a band saw tool of the thirteenth aspect, wherein the first and second connector structures each include a ridge disposed in a recess, wherein one of the ridge and the recess are the same ridge or recess as between the first and second connector structures.

In a fifteenth aspect, a band saw tool of the fourteenth aspect, wherein the first connector structure includes a first recess in the bracket plate and a screw that fastens a ridge on the roller bracket in the first recess, and wherein the second connector structure includes a second recess in the bracket plate and the screw that fastens the ridge on the roller bracket in the second recess.

In a sixteenth aspect, a band saw tool of the thirteenth aspect, further comprising: first and second receivers on the blade housing; first and second adjuster channels in corresponding ones of the first and second receivers, the bracket plates of the first and second blade guides being mounted on the corresponding first and second adjuster channels; and first and second adjuster knobs fastening the corresponding first and second adjuster channels in the corresponding first and second receivers.

In a seventeenth aspect, a band saw tool of the thirteenth aspect, further comprising: a lateral extension extending from the roller bracket of at least one of the first and second blade guides.

In an eighteenth aspect, a band saw tool of the thirteenth aspect, wherein the roller brackets of the first and second blade guides each include a pair of rollers disposed on opposite sides of the band saw blade.

In a nineteenth aspect, a band saw tool of the thirteenth aspect, wherein the first and second connector structures are configured to permit adjustment of the first and second blade guides in a direction transverse to the band saw blade.

In a twentieth aspect, a band saw tool of the thirteenth aspect, wherein the first and second connector structures of each blade guide include a single screw that selectively the roller bracket in either the first position or the second position.

Thus, there is shown and described blade guides that permit easy and quick adjustment of a band saw blade between a twisted and non-twisted position. The blade guides may be adjusted in position transverse to the blade and along the length of the blade by externally accessing the adjustment means without requiring that the housing be opened or that parts be disassembled. The blade positions are defined by the blade guides without guesswork by the user.

Although other modifications and changes may be suggested by those skilled in the art, it is the intention of the inventors to embody within the patent warranted hereon all changes and modifications as reasonably and properly come within the scope of their contribution to the art.

We claim:

1. A blade guide for use on a band saw tool having a band saw blade, the blade guide comprising:
   a mounting bracket configured for mounting to the band saw tool;
   a bracket plate connected to the mounting bracket, the bracket plate including first and second independent recesses oriented at an angle to one another, wherein the first and second recesses are not parallel to each other;
   a roller bracket configured for mounting to the bracket plate, the roller bracket having a ridge shaped to be received in the first and second recesses in the bracket plate such that the roller bracket and the bracket plate are connectable to one another in first and second mounting positions associated with first and second recesses respectively; and
   rollers mounted on the roller bracket, the rollers being configured for engaging the band saw blade of the band saw tool, the rollers being configured for guiding the band saw blade in a first position when the roller bracket and the bracket plate are connected in the first mounting position and for guiding the band saw blade in a second position when the roller bracket and the bracket plate are connected in the second mounting position, the first and second positions being disposed at an angle to one another so that at least one of the first and second positions impart a twist in the band saw blade;
   wherein the rollers are pivotally mounted on roller axles, and the ridge on the roller bracket extends longitudinally in a direction parallel with the roller axles.

2. A blade guide as claimed in claim 1, further comprising:
   a single fastener securing the roller bracket to the bracket plate.

3. A blade guide as claimed in claim 1,
   wherein the shape of the ridge and the recesses are configured to prevent rotation of the roller bracket on the bracket plate when the ridge is mounted in one of the recesses.

4. A blade guide as claimed in claim 1, wherein the roller bracket is adjustably positionable on the bracket plate along a direction substantially parallel with the roller axles.

5. A blade guide as claimed in claim 1, wherein the rollers are fixed in position on the roller bracket regardless of whether the roller bracket and the bracket plate are connected in the first or second mounting positions.

6. A blade guide as claimed in claim 1, wherein the rollers on the roller bracket include first and second rollers mounted for positioning on opposite sides of a band saw blade and a back roller mounted at a back edge of the band saw blade, the first and second rollers and the back roller being mounted in fixed positions on the roller bracket.

7. A blade guide as claimed in claim 1, further comprising a fastener extendable through the ridge in the roller bracket and the first or second recesses in the bracket plate to secure the roller bracket to the bracket plate in either the first or second mounting position.

* * * * *